July 30, 1957  F. D. PRINDLE  2,801,320
APPARATUS FOR ATTACHING A THERMOSTAT TO A WATER HEATER TANK
Filed Dec. 28, 1955

INVENTOR.
FRANK D. PRINDLE
BY
Attorneys

2,801,320
APPARATUS FOR ATTACHING A THERMOSTAT TO A WATER HEATER TANK

Frank D. Prindle, Kankakee, Ill., assignor to A. O. Smith Corporation, Milwaukee, Wis., a corporation of New York Application December 28, 1955, Serial No. 555,876

6 Claims. (Cl. 219—38)

This invention relates to a water heater having a wrap-around electrical heating assembly and more particularly to a water heater in which the wrap-around heating assembly is employed to secure the thermostat to the outer surface of the tank.

Recently there has been increased interest and development of flexible electrical wrap-around heating units for water heaters. The wrap-around heating unit has definite advantages over the immersion-type element in that the use of the wrap-around unit reduces the number of openings in the tank wall and decreases the amount of exposed metal area in the tank to be protected from corrosion. With a wrap-around heating unit, a contact-type thermostat is generally used, and the thermostat is secured against the outer wall of the tank. In most cases the thermostat is secured to the tank wall by either a separate strap or by attaching the thermostat to a bracket which is welded to the tank wall.

The present invention is directed to an apparatus for securing the thermostat in tight contacting relation with the wall of the tank by utilizing the springs connecting the ends of the wrap-around heating element unit to force the thermostat into tight engagement with the tank wall.

According to the invention, a tank or other container is provided with a wrap-around heating unit which is secured around the outer surface of the tank. The heating unit includes a flexible electrical heating element which is secured in heat conductive relation to the outer surface of the tank and which is disposed within a generally channel-shaped casing. The casing serves as a guide track for positioning the heating element around the tank, and the ends of the casing are connected by a series of coil springs which hold the casing tightly against the tank.

The thermostat is provided with a pair of notches on the side walls thereof. The upper end of a bracket is adapted to engage the notches in the thermostat and the lower end of the bracket bears against the wall of the tank. The bracket is forced inwardly to urge the thermostat tightly against the tank wall by disposing the central portion of the bracket beneath the springs connecting the ends of the channel-shaped casing.

The springs, in effect, serve a dual function in that they not only connect the ends of the heating element casing, but also serve to bias the thermostat against the wall of the tank.

The present invention provides a means for readily installing and removing the thermostat. By merely pulling outward on the spring the thermostat can either be slipped into position against the tank wall or removed from position beneath the spring, as desired.

The present invention has the advantage of enabling the thermostat to be quickly moved from one heating unit to another in cases where there are a series of wrap-around heating units disposed around the tank in order to provide the water heater with a selective capacity.

The drawings furnished herewith illustrate the best mode presently contemplated of carrying out the present invention.

Figure 1:
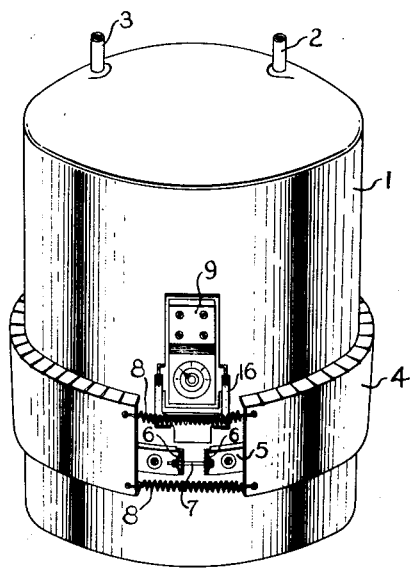
Figure 1 is a perspective view of a water heater embodying the present invention.
Figure 2:
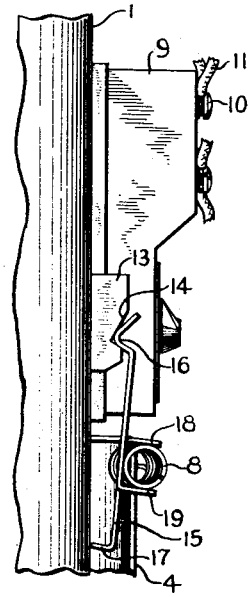
Fig. 2 is an enlarged fragmentary side elevation showing the attachment of the thermostat to the tank wall.
Figure 3:
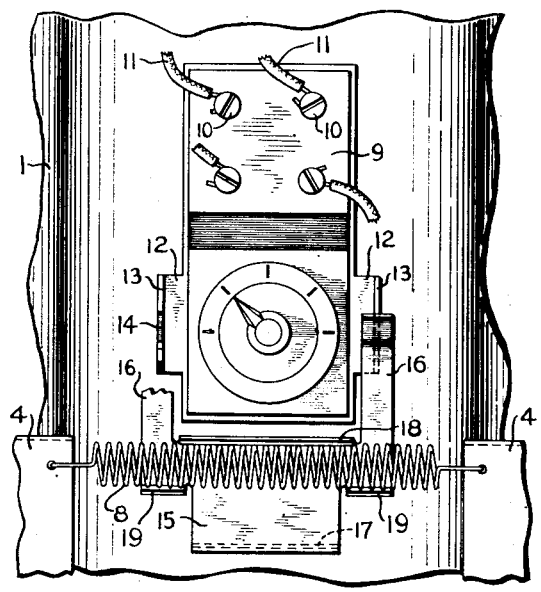
Fig. 3 is a front plan view of the structure shown in Fig. 2.

The drawings illustrate a tank 1 or the like to contain water or other fluids to be heated. The cold water is introduced into the tank through an inlet 2 and hot water is withdrawn from the tank through the outlet 3.

The water within the tank 1 is heated by an electrical wrap-around heating unit which is disposed around the outer surface of the tank. The heating unit includes a generally channel-shaped casing 4 which houses a flexible electrical heating element 5, that is disposed in heat conductive relation with the tank. The ends of the heating element are connected together by a spring connection which includes a pair of spring clips 6, each of which is secured to an end of the heating element 5. The clips 6 are secured together by bolt 7, and by threaded adjustment of the bolt the tension of the heating element around the tank 1 can be varied. In addition, the resilient connection between the ends of the heating element 5 permits the element to freely expand and contract during heating and cooling, and maintains the element in tight bearing relation with the tank at all times.

The casing 4 serves to guide the heating element 5 around the tank during installation and also to protect the element during service. The open side of the channel-shaped casing 4 faces the tank and the flanges of the casing bear against the tank wall on opposite sides of the heating element 5. The casing 4, in effect, provides a tunnel which serves as a guide track through which the heating element is inserted around the tank.

The ends of the casing 4 are connected together by a pair of coil springs 8, and according to the invention, the springs 8 serve a dual function, for they not only provide a resilient attachment of the casing to the tank wall but function to secure a thermostat 9 against the tank wall.

The thermostat 9 is of conventional construction and is connected electrically to the heating element to actuate the same in response to temperature variations of the water contained within the tank. The outer surface of the thermostat is provided with a series of contacts 10 which are connected by leads 11 to the heating element.

The thermostat 9 is provided with a pair of side extensions 12 which are disposed generally centrally of the length of the pan and terminate in outwardly extending flanges 13. The flanges 13 are provided with generally V-shaped notches 14.

The thermostat is adapted to be forced against the tank wall by a sheet metal bracket 15. The upper end of bracket 15 is provided with a pair of spaced arms 16 which are bent to provide V-shaped projections. The projections are adapted to engage the notches 14 in the flanges 13 of the thermostat extensions 12.

The lower end of the bracket 15 is provided with a flange 17 which bears against the wall of the tank 1 and serves as a fulcrum or pivot for the bracket.

The central portion of the bracket 15 is provided with an upper flange 18 and a pair of spaced lower flanges 19 which form a guide for the reception of spring 8. With this construction, the force of the spring 8 acts inwardly against the bracket 15 and tends to pivot the upper end of the bracket toward the tank. Thus, the force of the spring 8 is transmitted through the bracket to the thermostat 9 to bias the thermostat against the tank wall. As the notches 14 are positioned generally centrally of the length of the thermostat, the force of the spring acts against the central portion of the thermostat thereby insuring that the entire length of the thermostat is firmly positioned against the tank wall.

The thermostat may be easily installed by merely pulling outwardly on the spring 8 and slipping the bracket 15 therebeneath. The upper arms 16 of the bracket can then be drawn outwardly and the thermostat positioned so that the arms 16 engage the notches 14 in the thermostat. Similarly, the unit can be readily removed by merely drawing the spring 8 outwardly and removing the bracket 15 and the thermostat.

The present structure, by being easily installed, is particularly adaptable to a selective capacity water heater which has a series of wrap-around heating units disposed throughout the length of the tank. The heating units can be selectively energized to heat the portion of the water in the tank located above the particular heating unit. To change the thermostat from one heating unit to the other merely requires that the bracket 15 and thermostat 9 be removed from beneath the coil spring 8 of one heating unit and be reinserted beneath the coil spring of the desired heating unit.

The present construction does not interfere with the operation or positioning of the heating element 5. The heating element can extend substantially continuously around the periphery of the tank, for the thermostat is located above the heating element and not between the ends thereof. Furthermore, the thermostat is not in heating conductive relation with the heating element so that the thermostat will be responsive only to the temperature of the water contained within the tank and will not be affected by the heat of the heating element itself.

While the present invention is directed to a tank having a single heating element unit, it is contemplated that two or more heating elements may also be employed with a tank in which case a thermostat can be attached to each of the units or to any one of the units as desired.

Various modes of carrying out the invention are contemplated as being within the scope of the following claims particularly pointing out and distinctly claiming the subject matter which is regarded as the invention.

I claim:

1. A water heating apparatus comprising, a tank having a cold water inlet and a hot water outlet therein, a wrap-around electrical heating unit disposed around the outer surface of the tank and adapted to heat the water in the tank, a thermostat unit disposed in contact with the outer surface of the tank at a location above the heating unit and connected electrically to the heating unit for controlling the operation of the heating unit in response to temperature variations of the water in the tank, and resilient means connecting the ends of said heating unit together and biasing the thermostat unit into tight bearing engagement with the tank.

2. A water heating apparatus comprising, a tank having a cold water inlet and a hot water outlet therein, a wrap-around electrical heating unit disposed around the outer surface of the tank and adapted to heat the water in the tank, a thermostat unit disposed in contact with the outer surface of the tank at a location above the heating unit and connected electrically to the heating unit for controlling the operation of the heating unit in response to temperature variations of the water in the tank, resilient means connecting the ends of the heating unit together, and means engageable with said resilient means and said thermostat unit for transmitting the force of said resilient means to said thermostat unit at a position spaced upwardly from the heating unit to thereby bias the thermostat unit tightly against the tank.

3. An apparatus for attaching a thermostat to the outer surface of a hot water tank having a wrap-around electrical heating unit disposed around the outer surface of the tank which comprises, a thermostat adapted to be disposed in heat conductive relation with the outer surface of the tank, a pair of flanges disposed on opposite sides of the thermostat with each flange having a notch formed therein, a bracket having one end thereof in bearing engagement with the wall of the tank and having the opposite end thereof in locking engagement with the notches in said flanges, and resilient means associated with the wrap-around heating unit and disposed in engagement with the central portion of said bracket for pivoting said bracket about said first named end and forcing said second named end toward the tank to thereby urge the thermostat into tight engagement with the tank.

4. A water heating apparatus comprising, a tank having a cold water inlet and a hot water outlet therein, a wrap-around electrical heating unit disposed around the outer surface of the tank and adapted to heat the water in the tank, said heating unit including a flexible heating element disposed in contact with the outer surface of the tank and a hollow guide casing disposed in contact with the tank and defining a tunnel to receive said heating element, resilient means for connecting the ends of the heating element together and for resiliently holding the heating element in contact with the tank, second resilient means for connecting the ends of the casing together, a thermostat unit disposed in contact with the outer surface of the tank at a location above the heating unit and connected electrically to the heating element for controlling the operation of the heating element in response to temperature variations of the water in the tank, locking means associated with the thermostat unit and spaced a substantial distance from the ends thereof, and means engageable with said second resilient means for transmitting the force of said second resilient means to said locking means to thereby bias said thermostat unit tightly against the tank.

5. An assembly for heating and controlling the temperature of a liquid contained within a tank, which comprises a hollow generally U-shaped casing disposed around the tank and defining an annular chamber, a flexible heating element disposed within the chamber and secured in heat conductive relation to the outer surface of the tank, spring means for connecting the ends of the casing together, a thermostat unit disposed in contact with the outer surface of the tank at a location above the heating unit and connected electrically to the heating element for controlling the operation of the heating element in response to temperature variations of the water in the tank, a pair of extensions formed in opposite side edge portions of the thermostat unit and disposed generally centrally of the ends of said unit, a bracket having one end thereof in bearing engagement with the wall of the tank and having the opposite end thereof in locking engagement with the extensions, and means associated with the central portion of the bracket to receive the spring means and urge the second named end of the bracket into engagement with the extensions and thereby force the thermostat unit tightly against the tank.

6. Apparatus in combination with a wrap-around heating element for holding a thermostat against the outer wall of a tank to actuate said element, which comprises a casing housing said heating element and extending around the wall of the tank, at least one spring extending between the ends of the casing to hold the casing in place, a bracket freely disposed beneath the spring and extending radially therefrom in opposite directions, means on one end of the bracket disposed in engagement with the thermostat, and an inwardly extending projection on the opposite end of the bracket disposed in engagement with the tank wall and operating as a fulcrum about which the bracket is rotated under the force of said spring to securely hold the opposite end of the bracket against the tank wall.

References Cited in the file of this patent

UNITED STATES PATENTS

| | | |
|---|---|---|
| 2,452,214 | Vogel et al. | Oct. 26, 1948 |
| 2,498,950 | Fowler | Feb. 28, 1950 |
| 2,561,474 | Ingels | July 24, 1951 |
| 2,575,150 | Wellman | Nov. 13, 1951 |
| 2,686,031 | Bolesky | Aug. 10, 1954 |